US005526381A

United States Patent [19]
Boccuzzi

[11] Patent Number: 5,526,381
[45] Date of Patent: Jun. 11, 1996

[54] ROBUST NON-COHERENT DETECTOR FOR π/4-DQPSK SIGNALS

[75] Inventor: Joseph Boccuzzi, Brooklyn, N.Y.

[73] Assignee: AT&T Corp., Murray Hill, N.J.

[21] Appl. No.: 241,829

[22] Filed: May 12, 1994

[51] Int. Cl.⁶ .................................................. H03D 3/22
[52] U.S. Cl. .................... 375/331; 375/281; 375/332; 329/306; 329/310
[58] Field of Search ................................ 375/264, 283, 375/286, 324, 325, 328, 329, 330, 332, 279, 280, 281, 284, 331; 329/304, 310, 345, 306; 455/205, 214, 216

[56] References Cited

U.S. PATENT DOCUMENTS

| | | | |
|---|---|---|---|
| 5,058,136 | 10/1991 | Kazecki et al. | 375/332 |
| 5,067,139 | 11/1991 | Baker et al. | 375/332 |
| 5,195,108 | 3/1993 | Baum et al. | 329/304 |
| 5,202,643 | 4/1993 | Sato | 329/309 |
| 5,202,901 | 4/1993 | Chennakeshu et al. | 375/330 |
| 5,222,103 | 6/1993 | Gross | 375/281 |
| 5,260,673 | 11/1993 | Pham | 332/103 |
| 5,283,815 | 2/1994 | Chennakeshu et al. | 375/330 |
| 5,412,687 | 5/1995 | Sutton et al. | 375/202 |

OTHER PUBLICATIONS

Chicago Corporate Research and Development Center; Steven H. Goods et al., pp. 687–694.
IEEE Transactions on Vehicular Techonology, vol. 40, No. 3, Aug. 1991, pp. 558–568.
Proceedings of the IEEE, vol. 75, No. 4, Apr. 1987, pp. 436–476.
IEEE Transactions on Vehicular Techonology, vol. 40, No. 2, May 1991, pp. 355–365.

*Primary Examiner*—Stephen Chin
*Assistant Examiner*—Amanda T. Le

[57] ABSTRACT

A technique of demodulating a π/4-DQPSK composite carrier waveform using a non-coherent discriminator based receiver is presented. In particular, a means of recovering π/4-DQPSK modulated data symbols using a dual output discriminator in conjunction with a dual binary amplitude detection process in a discriminator based receiver is discussed. Means which improve the bit error rate of the receiver over the prior art are presented. Additionally, an amplitude detection means which readily provides synchronization of the detected data symbols is discussed which was not heretofore possible with the 4-level slicer of the prior art.

4 Claims, 4 Drawing Sheets

ROBUST NON-COHERENT DETECTOR FOR π/4-DQPSK SIGNALS

BACKGROUND OF INVENTION

This invention relates to a technique of demodulating a π/4-DQPSK composite signal using a non-coherent detector. In particular, this invention provides a means of recovering π/4-DQPSK modulated symbols using a simplified amplitude detection process in conjunction with a dual output discriminator in a Limiter-Discriminator-Integrate and Dump receiver.

THE PRIOR ART

π/4-DQPSK techniques are well known in the art to be effective in transmitting data over a channel. Discriminator based receivers are also well known in the art to provide non-coherent detection of π/4-DQPSK modulated data symbols. FIG. 1 shows a block diagram of a typical discriminator based receiver.

The antenna 2 collects radio frequency energy which is in the form of a composite carrier waveform $A(t) \cdot Cos(W_o t + \Theta(t))$, propagating over a transmission medium. The composite carrier waveform contains data symbol information which has been modulated using prior art π/4-DQPSK techniques. The received composite carrier waveform is then amplified by a low noise amplifier (LNA) 4 and filtered by a band pass filter (BPF) 6 producing a more spectrally correct representation of the original transmitted composite carrier waveform. A quadrature demodulator 8 recovers an in-phase analog signal Ik and a quadrature analog signal Qk from the composite carrier waveform.

As shown in FIG. 1, some of the data symbol recovery functions can be implemented using a digital signal processing (DSP) chip or an Application Specific Integrated Circuit (ASIC) 22; either way the process is the same.

The analog signals Ik and Qk are digitized, using analog to digital converters 10 and 12, producing Ikd and Qkd respectively. A limiter 14 ensures that fading does not become problematic in the remaining process. The limiter scales Ikd and Qkd producing limited quadrature components Ikdl and Qkdl such that if they were coordinates on a cartesian graph, the resultant point would always fall on a unit circle.

A discriminator (DSCRM) 16 takes Ikdl and Qkdl as inputs and produces a multi-level output signal 68. The multi-level output signal 68 has the data symbol information mapped in its amplitude. The multi-level output signal 68 is a 4-level signal wherein its amplitude is within one of four possible voltage bands. The transfer function of the DSCRM 16 is well known in the art and is shown in FIG. 2 along with the remaining process blocks 18 and 20.

With reference to FIG. 2, in the DSCRM 16 a first differentiating circuit 50 differentiates a first input signal Ikdl and produces signal 60. Signal 60 is coupled to a first multiplying circuit 51 which operates on a second input signal Qkdl, multiplies it by signal 60 and produces signal 61. A second differentiating circuit 52 differentiates the second input signal Qkdl and produces signal 62. Signal 62 is coupled to a second multiplying circuit 53 which operates on the first input signal Ikdl, multiplies it by signal 62 and produces signal 63. Signal 61 and signal 63 are coupled to a summing circuit 54 which takes the difference between signal 63 and signal 61 producing an intermediate multi-level signal 64 which is not used as an output. A first squaring circuit 56 squares a first input signal Ikdl and produces signal 65. A second squaring circuit 57 squares a second input signal Qkdl and produces signal 66. Signal 65 and signal 66 are coupled to a summing circuit 58 which sums signal 65 and signal 66 producing signal 67. The intermediate multi-level signal 64 and signal 67 are coupled to a dividing circuit 59 which divides the intermediate multi-level signal 64 by signal 67 producing the multi-level output signal 68.

An integrate and dump function 18, with the use of data symbol timing information, produces a more refined 4-level output signal 69. Finally, a 4-level slicer 20 is used to output the data symbols, (Xk,Yk), according to the amplitude of the 4-level signal 69. The function of a 'slicer' is defined herein to be a means for detecting the amplitude band of a particular signal and outputting a corresponding data symbol bit pair (Xk,Yk). Table 1 shows one possible truth table of the 4-level slicer.

TABLE 1

| 4-Level Slicer Truth Table. | | |
|---|---|---|
| 4-level signal Amplitude | Xk | Yk |
| Level 1 | 0 | 1 |
| Level 2 | 0 | 0 |
| Level 3 | 1 | 0 |
| Level 4 | 1 | 1 |

Thus the data symbols are recovered where Xk are odd bits and Yk are even bits of the original transmitted binary bit stream.

This invention overcomes two limitations of a non-coherent π/4-DQPSK discriminator based receiving system employing a 4-level slicer for symbol recovery. First, since the 4-level slicer must accurately place the amplitude of the 4-level signal in one of four voltage bands, any noise or other distortion of the 4-level signal may cause an error in data symbol recovery. The I&D function is added to reduce the effect of noise in the recovery process; however, even better noise performance is achieved using this invention. Secondly, because a 4-level signal has four possible amplitudes, a more complex synchronization circuit is thus required in the prior art than is needed for a binary signal of the present invention. Synchronization of down stream processes with the slicer function output of the prior art and the present invention is needed to ensure accurate data symbol recovery.

SUMMARY OF THE INVENTION

The present invention is a π/4-DQPSK discriminator used in conjunction with dual binary amplitude detectors for recovering π/4-DQPSK modulated data symbols in a non-coherent discriminator based receiver. The present invention makes use of an intermediate multi-level output signal which was not heretofore put into use in the discriminator of the prior art. The present invention also makes use of the multi-level output signal more typically used in the discriminator of the prior art. The data symbol is recovered in part using a 2-level slicer to detect the amplitude of the intermediate multi-level output signal. The remaining portion of the data symbol is recovered using a 2-level slicer to detect the amplitude of the multi-level output signal.

DESCRIPTION OF THE DRAWING

The invention can be better understood when considered with the following drawing wherein.

DETAILED DESCRIPTION OF THE PREFERRED EMBODIMENT

Figure 1:
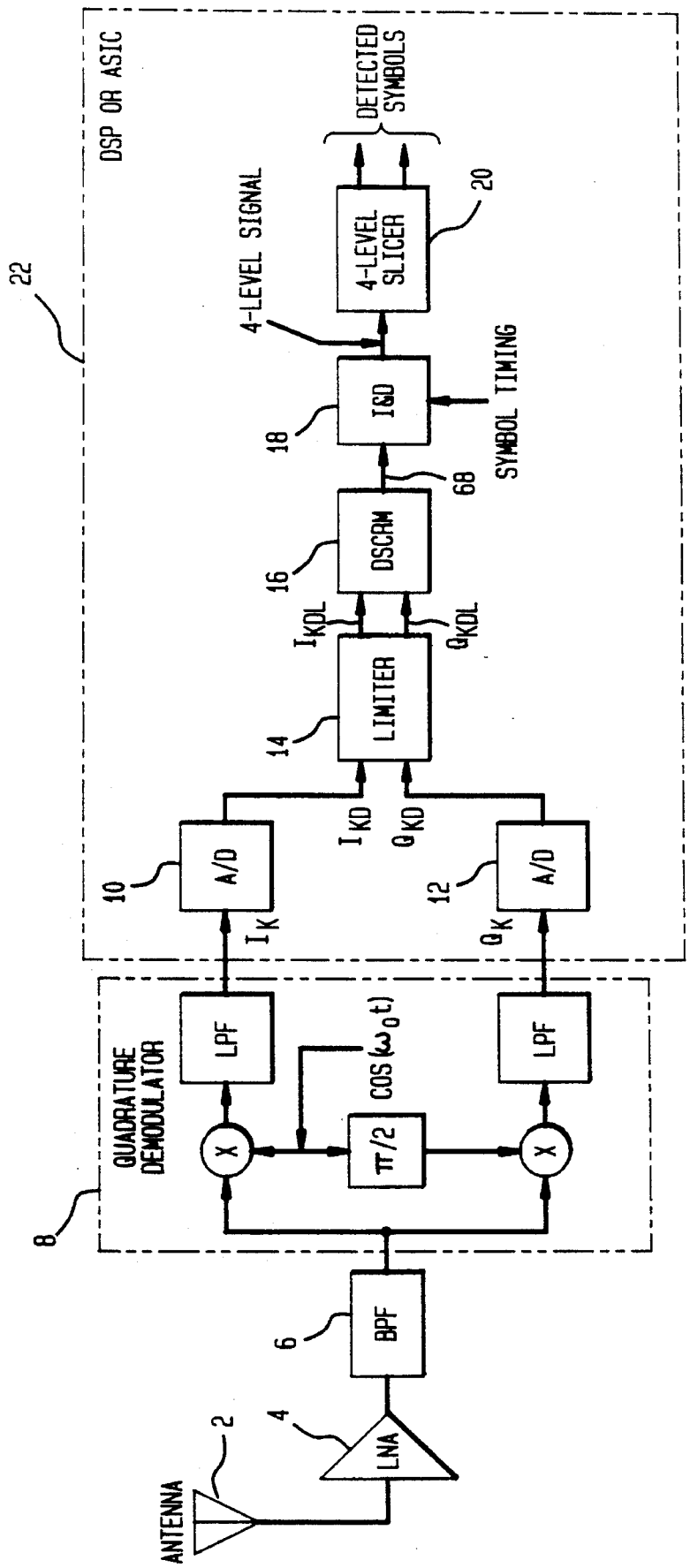
FIG. 1 is a block diagram of a typical π/4-DQPSK non-coherent discriminator based receiver of the prior art.
Figure 2:
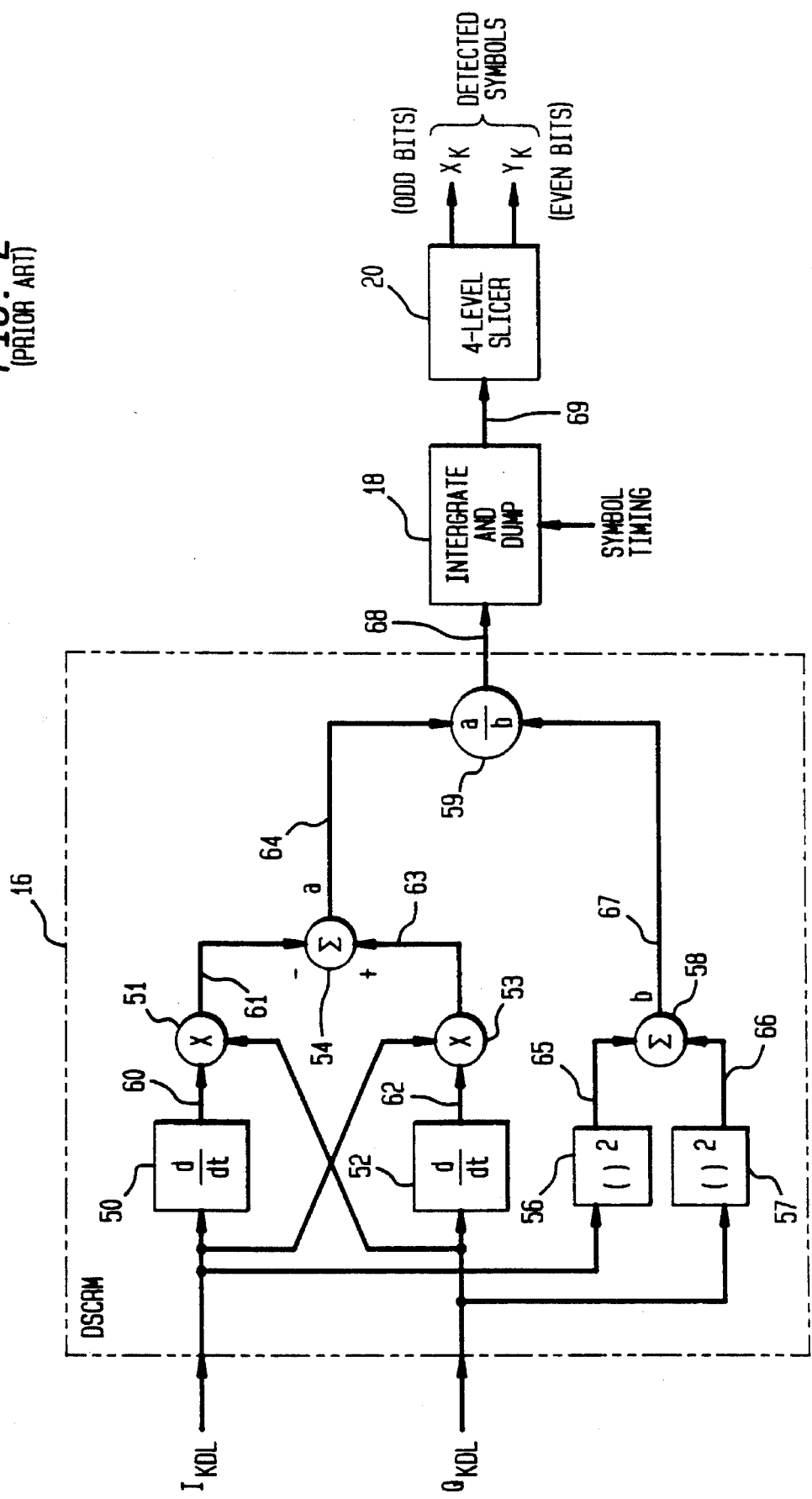
FIG. 2 is a detailed diagram of a typical discriminator transfer function of the prior art.
Figure 3:
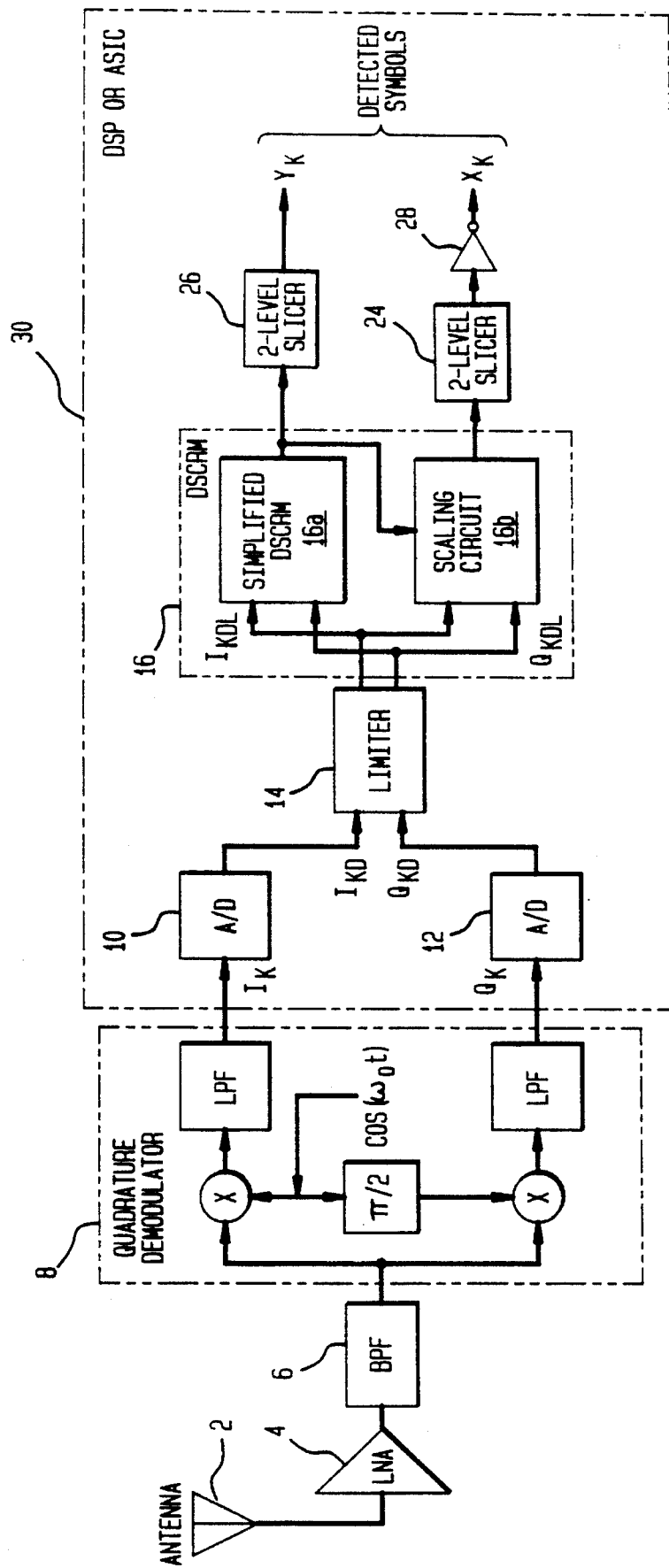
FIG. 3 is a block diagram of a non-coherent π/4-DQPSK discriminator based receiver comprising a discriminator further comprising a first function (a) and second function (b) where function (a) is also a simplified discriminator of the present invention.

Reference is now made to FIG. 3 which shows a block diagram of the non-coherent discriminator based receiver of the present invention. The operation of this receiver is the same as the aforementioned prior art up to and including the outputs Ikdl and Qkdl of the limiter 14. In this invention, the prior art DSCRM 16 is divided functionally into two parts: a simplified discriminator 16a, and a scaling circuit 16b as shown in FIG. 3. The simplified discriminator 16a is named as such because it can discriminate quadrature component signals into a multi-level output signal where the multi-level output signal is two levels. The simplified discriminator 16a and the scaling circuit 16b are each coupled to a 2-level slicer 24 and 26 respectively.

Figure 4:
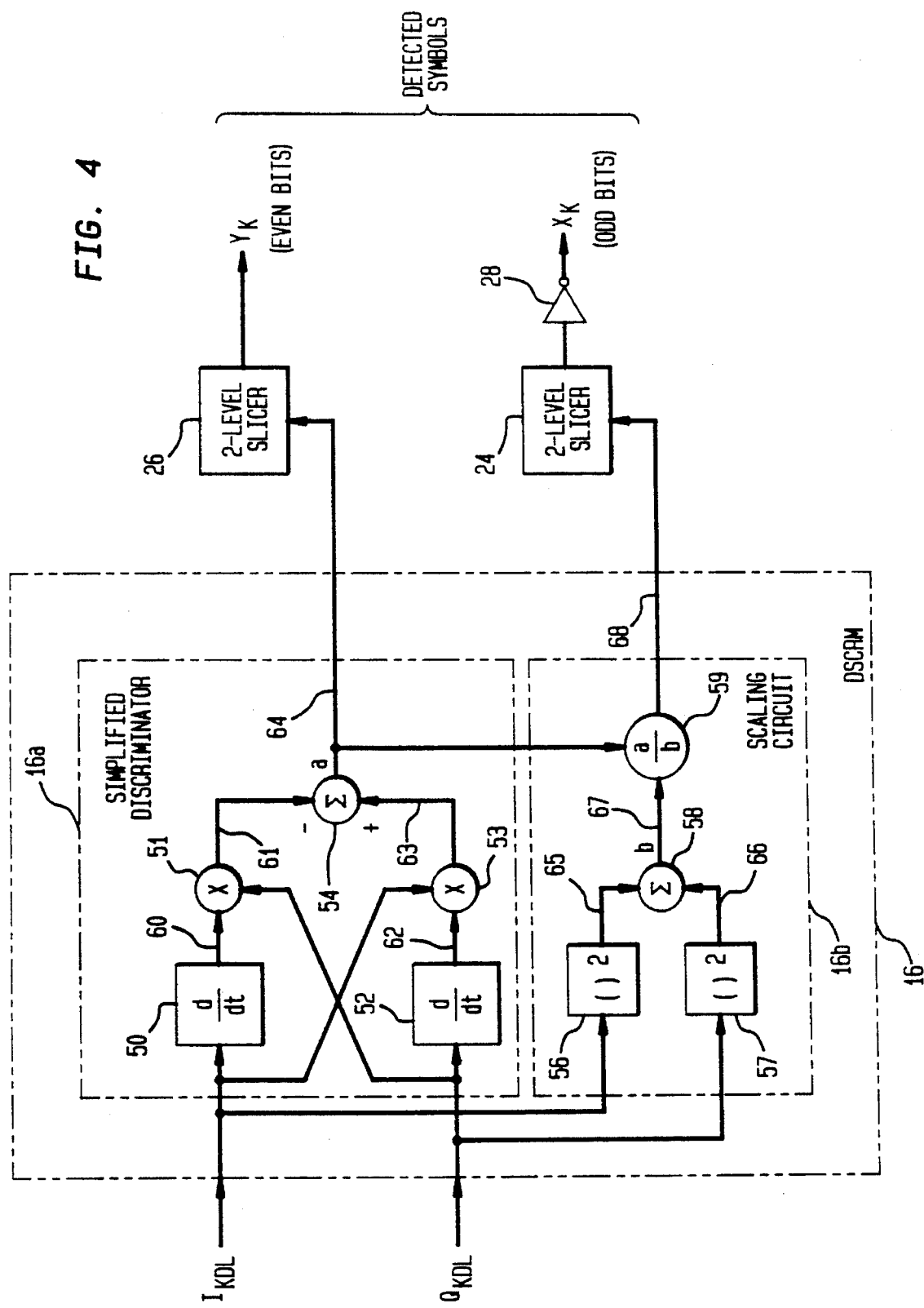
FIG. 4 is a detailed diagram of the first and second functions (a) and (b) of the discriminator of the present invention.

FIG. 4 shows a more detailed diagram of the simplified discriminator 16a and the scaling circuit 16b as well as the block diagram of a first 2-level slicer 24, a second 2-level slicer 26, and an invertor 28 of the present invention.

The discriminator 16 of the present invention operates exactly as in the prior art described above. The present invention utilizes the intermediate multi-level signal 64 as an output signal which is operated on by the 2-level slicer 26. Further, instead of the multi-level output signal 68 being input to the integrate and dump function 18, it is input to the second 2-level slicer 24.

Since the DSCRM 16 in FIG. 4 is the same as the aforementioned discriminator of the prior art, the multi-level output signal 68 of the scaling circuit 16b is also a 4-level signal. From the truth table shown in Table 1 and in accordance with this invention, it is noted that a 2-level slicer with a decision level set between Level 2 and Level 3 can properly detect the Xk bit stream so long as the output of the 2-level slicer 24 is post processed using an inverter circuit 28. Thus, as shown in FIG. 4, the multi-level output signal 68 is coupled to the 2-level slicer 24 which compares its amplitude with a pre-selected threshold and outputs a binary signal which, once inverted, represents the signal Xk.

The intermediate multi-level output signal 64 of the simplified discriminator 16a is inherently a 2-level signal. As such, a 2-level slicer with a properly selected decision level can, in accordance with this invention, detect the Yk bit stream. Thus the intermediate multi-level output signal 64 is coupled to the 2-level slicer 26 which compares its amplitude with a pre-selected threshold and outputs a binary signal which represents the signal Yk.

In accordance with this invention, the disadvantage of more error prone level detection in noise of the prior art is overcome. Typically, noise errors become problematic as component temperatures vary and as components age. The signals entering the 2-level slicers 24 and 26 are of full dynamic range and, since only one decision level per 2-level slicer is needed, noise errors are reduced despite component aging and component temperature variation. Also, the slicer outputs readily provide synchronization of the detected data symbols because, being 2-level slicers, their decision rules are binary. The output of a slicer with a binary decision rule can output a synchronization signal using minimal circuitry not heretofore possible with the 4-level slicer of the prior art.

The foregoing description of the preferred embodiment of the invention has been presented for the purposes of illustration and description. It is not intended to be exhaustive or to limit the invention to the precise form disclosed. Modifications and variations are possible in light of the above teaching. It is intended that the scope of the invention be not limited by this detailed description, but rather by the claims appended hereto.

I claim:

1. A π/4-DQPSK non-coherent discriminator based receiver comprising:
   (a) means for demodulating quadrature component signals of a received π/4-DQPSK composite carrier waveform,
   (b) means for limiting said quadrature component signals to produce limited quadrature component signals,
   (c) a discriminator comprising:
      (i) a simplified discriminator wherein a first input signal is differentiated and multiplied by a second input signal and the product is subtracted from the product of said first input signal and the derivative of said second input signal producing an intermediate multi-level output signal, and
      (ii) a scaling circuit wherein said first input signal is squared and summed with the square of said second input signal and said sum is divided into said intermediate multi-level output signal producing an multi-level output signal,
   (d) a first means for detecting the level of said multi-level output signal and producing a corresponding first part of a data symbol, and
   (e) a second means for detecting the level of said intermediate multi-level output signal and producing a corresponding second part of said data symbol.

2. The π/4-DQPSK non-coherent discriminator based receiver of claim 1 wherein:
   (a) said first means of detecting the level of said multi-level output signal comprises a first 2-level voltage detector means which outputs a first voltage level when said multi-level output signal is above a voltage limit and outputs a second voltage level when said multi-level output signal is below said voltage limit, and
   (b) said second means of detecting the level of said intermediate multi-level output signal comprises a second 2-level voltage detector which outputs a first voltage level when said intermediate multi-level output signal is above a voltage limit and outputs a second voltage level when said intermediate multi-level output signal is below said voltage limit.

3. An apparatus comprising:
   (a) a π/4-DQPSK non-coherent discriminator wherein a first input signal is differentiated and multiplied by a second input signal and the product is subtracted from the product of said first input signal and the derivative of said second input signal producing an intermediate multi-level output signal which is divided by the sum of the squares of said first input signal and said second input signal producing a multi-level output signal,
   (b) means for processing said multi-level output signal to produce part of a data symbol, and (c) means for processing said intermediate multi-level output signal to produce part of said data symbol.

4. The apparatus of claim 3 wherein:

(a) said means for processing said multi-level output signal comprises a first 2-level voltage detector means which outputs a first voltage level when said multi-level output signal is above a voltage limit and outputs a second voltage level when said multi-level output signal is below said voltage limit, and (b) said means for processing said intermediate multi-level output signal comprises a second 2-level voltage detector which outputs a first voltage level when said intermediate multi-level output signal is above a voltage limit and outputs a second voltage level when said intermediate multi-level output signal is below said voltage limit.

* * * * *